United States Patent [19]

Yoshida et al.

[11] Patent Number: 4,672,589
[45] Date of Patent: Jun. 9, 1987

[54] UNDERWATER DETECTION SYSTEM

[75] Inventors: Takashi Yoshida; Takashi Yoshioka; Yasuhiko Endo, all of Kobe, Japan

[73] Assignee: Furuno Electric Co., Ltd., Nishinomiya, Japan

[21] Appl. No.: 838,873

[22] Filed: Mar. 10, 1986

Related U.S. Application Data

[63] Continuation of Ser. No. 459,438, Jan. 20, 1983.

[51] Int. Cl.$^4$ .......................... G01S 15/42; G01S 7/62
[52] U.S. Cl. .................................... 367/104; 367/110; 367/113
[58] Field of Search .................. 367/11, 104, 110, 113

[56] References Cited

U.S. PATENT DOCUMENTS

| | | | |
|---|---|---|---|
| 2,759,783 | 8/1956 | Ross | 367/112 |
| 3,012,244 | 12/1961 | Langenwalter et al. | 367/122 |
| 3,129,402 | 4/1964 | Henne | 367/13 |
| 3,967,233 | 6/1976 | Maguer et al. | 367/104 |
| 4,045,766 | 8/1977 | Iada | 367/105 |
| 4,276,618 | 6/1981 | Green | 367/11 |
| 4,375,671 | 3/1983 | Engle | 367/11 |

OTHER PUBLICATIONS

Brochure entitled "Simrad SM 600, Multibeam Sonar", Radio Maritine Co., 6 pages, no date.
Bodholt, Con. Electronics for Ocean Technology, pp. 283–290, Sep. 1981.
Duck et al, Con. Electronics for Ocean Technology, pp. 215–226, Sep. 1981.

Primary Examiner—Richard A. Farley
Attorney, Agent, or Firm—Jordan and Hamburg

[57] ABSTRACT

An underwater detection system which has a transmitting and receiving unit for radiating an ultrasonic wave pulse into the water within a narrow sector and receiving echo signals by a plurality of reception beams, and turns the transmitting and receiving unit by a predetermined angle to search another narrow sector each time the search within the narrow sector is completed, thereby searching the water within a wide angular range.

6 Claims, 5 Drawing Figures

UNDERWATER DETECTION SYSTEM

This application is a continuation, of application Ser. No. 459,438, filed Jan. 20, 1983.

BACKGROUND OF THE INVENTION

This invention relates to an underwater detection system for searching the water within a wide angular range. Particularly it relates to a system which has a transmitting and receiving unit for transmitting an ultrasonic wave pulse into the water within a narrow sector of a predetermined angle and receiving echo signals by a plurality of reception beams, and turns the transmitting and receiving unit by a predetermined angle to search another narrow sector each time the search within the preceding narrow sector is completed, thereby searching the water within a wide angular range.

As one of prior art underwater detection systems, a PPI sonar has been widely used. A PPI sonar is disclosed in U.S. Pat. No. 2,759,783. The PPI sonar slowly rotates a transducer which radiates an ultrasonic wave pulse into the water in a direction and receives echo signals therefrom with a reception beam, thereby transmitting ultrasonic wave pulses in successive different directions and hence searching the water within a wide angular range. One of the drawbacks of the PPI sonar is its slow speed of searching. Assuming now that the beam width of a transmission beam and a reception beam is six degrees and the detection range of the sonar is 750 meters, it takes one second to search the water in a given direction and hence it takes sixty seconds to complete the search in all directions i.e., 360 degrees. Since the search in each direction is made every sixty seconds and the ship which is equipped with the PPI sonar advances, there will be areas where the search is not made.

Another prior art underwater detection system as disclosed in U.S. Pat. No. 4,045,766 has also been widely used. The prior art system has a plurality of transducers disposed on a circle and successively forms a series of directional reception beams along a circumferential direction at high speed, thereby searching the water in all directions very rapidly. A narrow reception beam is formed in a direction by appropriately phase-shifting the reception signals caught by each of selected groups of transducers. Reception beams will be successively formed in a circumferential direction by selecting different groups of transducers. But the construction of such a system will be complicated and the system inevitably will be bulky and costly.

SUMMARY OF THE INVENTION

Accordingly, an object of this invention is to provide an underwater detection system which is capable of searching the water within a wide angular range at a relatively high speed.

Another object of this invention is to provide an underwater detection system which successively searches the water within each of a plurality of narrow sectors, thereby searching the water within a wide angular range.

Another object of this invention is to provide an underwater detection system which has a transmitting and receiving unit for radiating an ultrasonic wave pulse into the water in a narrow sector of a predetermined angle and receiving echo signals by a plurality of reception beams formed within the sector, and turns the transmitting and receiving unit by a predetermined angle to search another narrow sector each time the search within the preceding narrow sector is completed, thereby searching the water within a wide angular range.

According to one aspect of the invention, the underwater detection system comprises (a) transmitting and receiving means for transmitting an ultrasonic wave pulse into the water within a sector of a predetermined angle and receiving echo signals, (b) a beam-former for forming directional reception beams in different azimuthal directions within the sector and successively producing echo signals derived by the directional reception beams, (c) turning means for turning said transmitting and receiving means by a predetermined angle after the search within said sector is completed, (d) an indicator for displaying the signals from said beam-former at corresponding locations thereon, (e) a memory having memory elements each of which corresponds to a picture element of the screen of said indicator, (f) a sweeping circuit for sweeping at least one electron beam of said indicator over the screen, (g) reading means for reading out a stored signal from a memory element corresponding to a picture element at which the electron beam hits, (h) coordinate converting means for converting the location of the signal from said beam-former to the location of a picture element of the screen of said indicator based on the direction and range relating to the signal, and (i) writing means for writing an output signal from said beam-former into a memory element determined by output signals from said coordinate converting means.

DETAILED DESCRIPTION OF THE PREFERRED EMBODIMENTS

Figure 1:
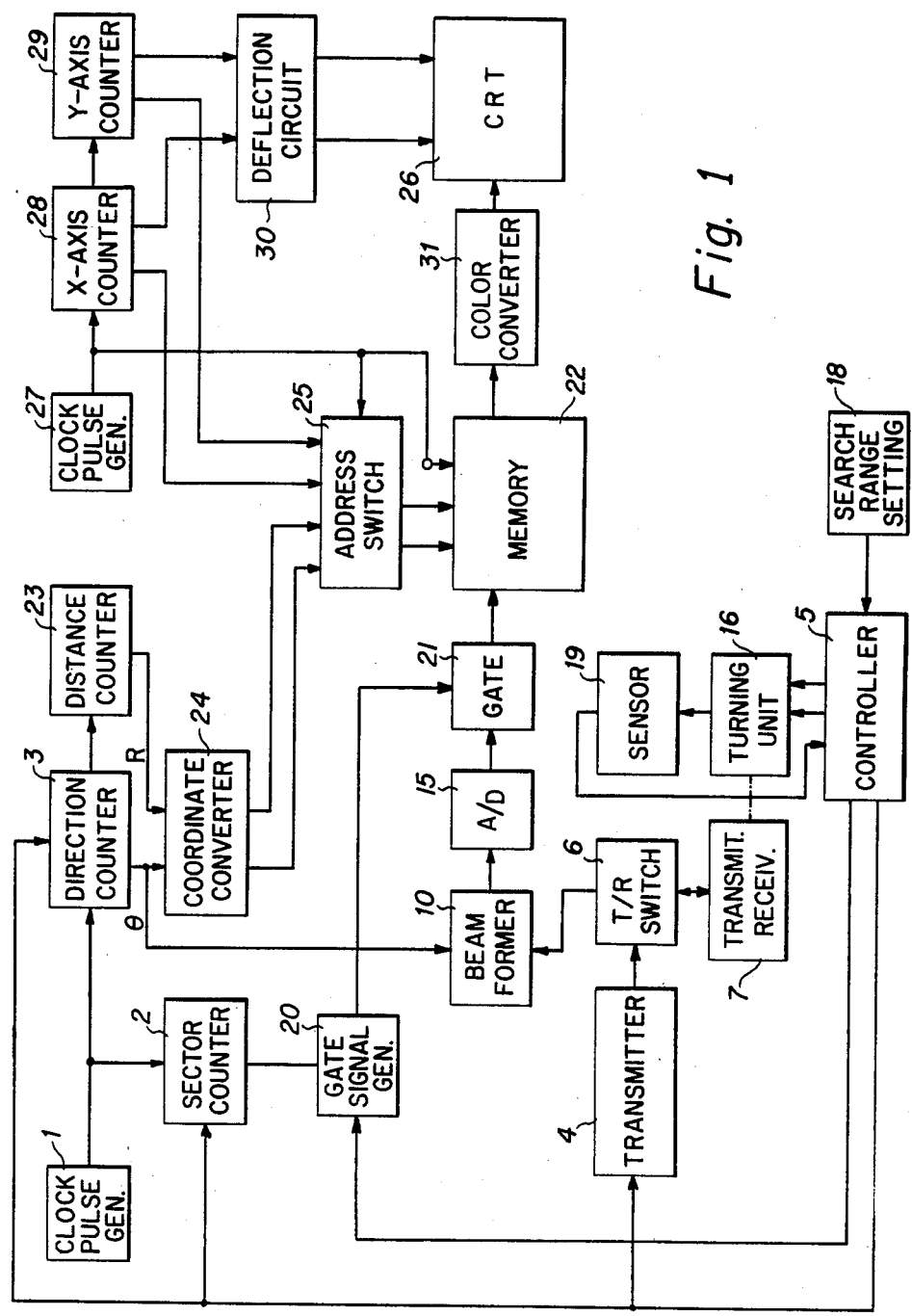
FIG. 1 shows a schematic block diagram of an underwater detection system according to an embodiment of the invention.
Figure 2:
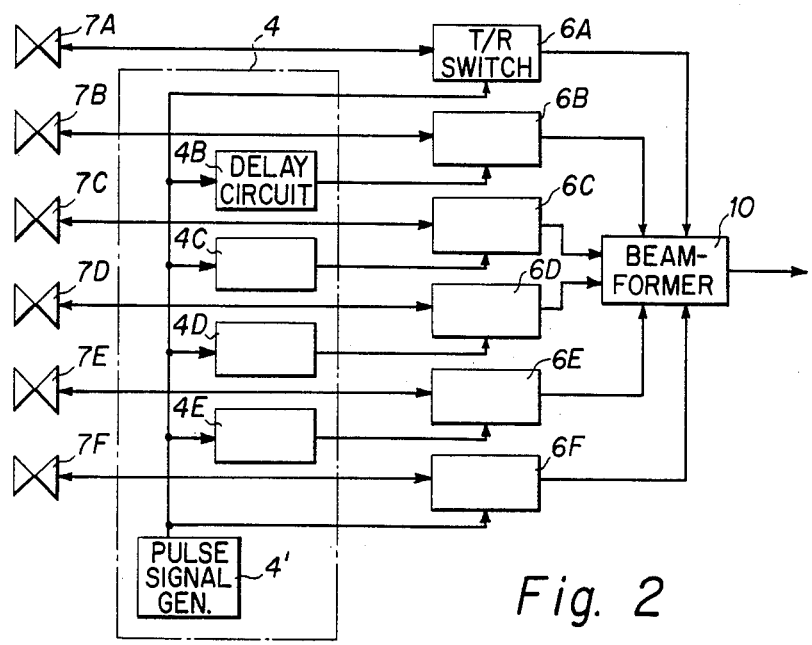
FIG. 2 shows a schematic block diagram of a portion of FIG. 1, particularly a detailed block diagram of a transmitter and a transmit-receive switch unit.

Referring to FIG. 1, a clock pulse generator 1 supplies clock pulses to a sector counter 2 and a direction counter 3. A controller 5 supplies a start signal to the sector counter 2, the direction counter 3 and a transmitter 4. The transmitter 4 produces in response to the start signal signals of a frequency as amplitude-modulated by a pulse, and supplies the pulse signals to a transmitting and receiving unit 7 through a transmitreceive switch unit 6. The transmitting and receiving unit 7 radiates an ultrasonic wave pulse in response to the pulse signals applied thereto into the water in a sector, smaller than 36°, of for example 30 degrees. As illustrated in FIG. 2, the transmitter 4 comprises a pulse signal generator 4' and delay circuits 4B through 4E. The pulse signal generator 4' produces in response to the start signal the signal of a frequency as amplitude-modulated by the pulse, and supplies the pulse signal to the delay circuits 4B through 4E each of which comprises counters. The delay circuits 4B and 4E delay the output pulse signal from the pulse signal generator 4' by the same amount. The delay circuits 4C and 4D delay the output pulse signal from the pulse signal generator 4' by the same amount which, however, is larger than the amount of delay by the delay circuits 4B and 4E. The transmit-receive switch unit 6 comprises transmit-receive switches 6A through 6F. The transmitting and receiving unit 7 comprises six transducers 7A through 7F which are disposed on a horizontal straight line. The output pulse signal from the pulse signal generator 4' is directly supplied to the transducers 7A and 7F through the transmit-receive switches 6A and 6F, respectively. The delayed output pulse signals from the delay circuits 4B and 4E are supplied to the transducers 7B and 7E through the transmit-receive switches 6B and 6E, respectively. The delayed output pulse signals from the delay circuits 4C and 4D are respectively supplied to the transducers 7C and 7D through the transmit-receive switches 6C and 6D. As a result, the transmitting and receiving unit 7 radiates an ultrasonic wave pulse into a wide sector of 30 degrees.

Figure 3:
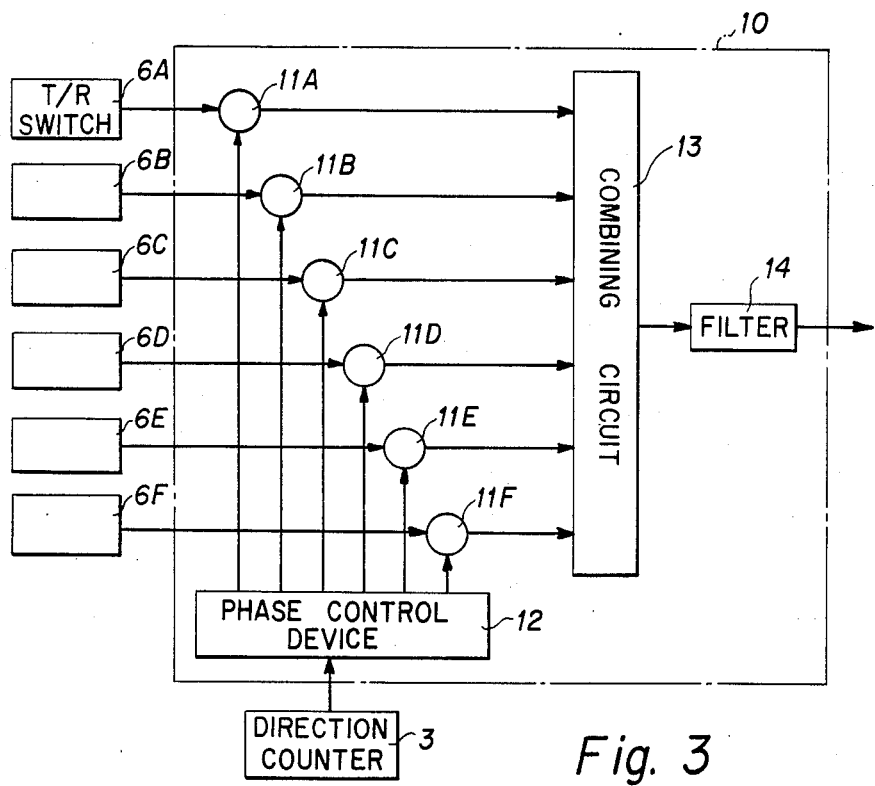
FIG. 3 shows a schematic block diagram of a portion of FIG. 1, particularly a detailed block diagram of a beam-former.

Reception signals caught by the transducers 7A through 7F are supplied to a beam-former 10 through the transmit-receive switch 6A through 6F, respectively. The beam-former 10 successively forms at a high speed six directional reception beams in different azimuthal directions at a uniform angular distance within the sector of 30 degrees, so that echoes from substantially the same range are caught by the respective reception beams. A reception beam is formed by appropriately phase-shifting the reception signals from the transducers 7A through 7F with respect to one another and combining the phase-shifted signals together. A reception beam can be turned within the sector of 30 degrees by varying the phase delay of the reception signals. The beam-former 10 comprises six mixers, a phase control device, a combining circuit and a filter as illustrated in FIG. 3. Output signals from the transmit-receive switches 6A through 6F are supplied to one input of each of mixers 11A through 11F, respectively. The phase control device 12 produces six pulse trains of a frequency at its six output terminals $T_1$ through $T_6$ and supplies the pulse trains to the other input of each of the mixers 11A through 11F, respectively, the pulse trains being progressively phase-shifted with respect to the foregoing ones. The mixer 11A modulates the reception signal from the transmit-receive switch 6A with the pulse train from the output terminal $T_1$ of the device 12. Similarly, the mixers 11B through 11F respectively modulate the reception signals with the pulse trains supplied thereto through the output terminals $T_2$ through $T_6$. Output signals from the mixers 11A through 11F are supplied to the inputs of the combining circuit 13. The combining circuit 13 combines together output signals from the and produces combined output signals to a filter 14. The filter 14 may comprise a low pass filter and passes the frequency difference components of output signals from the mixers. The phase difference amounts between the pulse trains produced by the phase control device 12 are desirably varied in response to the output signal from the direction counter 3. The principle of turning a reception beam in an angular direction by the beam-former 10 has been explained in U.S. patent application No. 396,530 of 1982 and in U.S. Pat. No. 4,117,487. The output signal from the filter 14 is supplied to an analog-digital converter 15.

A turning unit 16 comprises a pulse motor and is mechanically coupled to the transmitting and receiving unit 7 and controlled by the controller 5 to turn the transmitting and receiving unit 7 in a clockwise or an anticlockwise direction. A search range setting unit 18 sets the direction and angular range of the sector to be searched into the controller 5. The controller 5 comprises a microprocessor and supplies pulse signals and a rotational direction signal to the turning unit 16, thereby turning the transmitting and receiving unit 7 in a direction. A sensor 19 detects the pointing direction of the transmitting and receiving unit 7 and transmits a signal representing the direction of the unit 7 to the controller 5. The sensor 19 comprises a circular plate having a plurality of groups of four holes in radial directions and a plurality of four photointerrupters placed adjacent to the holes, with the circular plate coupled to the rotating shaft of the transmitting and receiving unit 7 and rotated in synchronism with the rotation of the unit 7. The controller 5 also supplies a direction signal representing the pointing direction of the transmitting and receiving unit 7 at a time when the unit is searching a sector, to a gate signal generator 20. The sector counter 2 starts in response to the start signal applied thereto to count the clock pulses from the clock pulse generator 1 and produces an output pulse each time it counts up the number of clock pulses corresponding to the angle of half of the sector to be searched. The gate signal generator 20 produces gate pulses at a time interval each having a pulse width corresponding to the angle of the sector to be searched based on the output pulse from the sector counter 2 and the direction signal from the controller 5. A gate 21 passes output signals from the analog-digital converter 15 to a memory unit 22 during the time period the gate pulse is applied thereto.

The direction counter 3 starts in response to the start signal to count the clock pulses from the clock pulse generator 1, and produces an output pulse to a distance counter 23 and is cleared to zero every time its count reaches a count value corresponding to an angle of 360 degrees, and supplies its count value to the beamformer 10 and a coordinate converter 24. The distance counter 23 increases its count in response to an output pulse from the direction counter 3, and supplies the count value representing the distance from the transmitting and receiving unit 7 to detected objects, to the coordinate converter 24, and is cleared to zero in count value when its count reaches to a value corresponding to the detection range. The coordinate converter 24 produces X- and Y-address signals and supplies these signals to the memory unit 22 through an address switch 25. The construction and operation of the coordinate converter 24 will be explained hereinafter. The memory unit 22 includes m×n semiconductor RAM (random access memory) elements arranged in m columns and n rows, with the number of RAM elements being the same as that of the picture elements of the screen of the CRT 26 wherein the picture elements are also arranged in m columns and n rows. Each memory element of the memory unit 22 consists of three bits. The memory unit 22 writes the output signal from the gate 21 into the storage location determined by X- and Y-address signals supplied from the coordinate converter 24. A clock pulse generator 27 supplies clock pulses to an X-axis counter 28, the address switch 25 and the read/write terminal of the memory unit 22. The frequency of the clock pulses from the clock pulse generator 27 is set higher than that of clock pulses from the clock pulse generator 1. The X-axis counter 28 repetitiously counts m clock pulses and transmits an output pulse to a Y-axis counter 29 every time its count reaches m, and supplies its count to the memory unit 22 through the address switch 25, and also supplies horizontal synchronous signals to a deflection circuit 30. The Y-axis counter 29 repetitiously counts n clock pulses, supplies its count to the memory unit 22 through the address switch 25, and further supplies vertical synchronous signals to the deflection circuit 30. The memory unit 22 reads a stored signal from the memory element determined by the count outputs from the X-axis and Y-axis counters 28 and 29. The address switch 25 comprises an electric switching device, and supplies either the X- and Y-address signals from the coordinate converter 24 or the counts from the X-axis and Y-axis counters depending on the polarity of the clock pulses from the clock pulse generator 27. When the X- and Y-address signals are supplied to the memory unit 22 and a write signal is applied to the read/write terminal of the memory unit 22 from the clock pulse generator 27, the output signal from the gate 21 is written into a memory element determined by the X- and Y-address signals. On the other hand, when the count outputs from the X-axis and Y-axis counters 28 and 29 are supplied to the memory unit 22 through the address switch 25 and a read signal is applied to the read/write terminal of the memory unit 22, the stored signal is read out from the memory element determined by the count outputs from the X-axis and Y-axis counters and fed to a color converter 31. The color converter 31 performs the necessary color conversion for displaying a predetermined color on the screen of the CRT in accordance with the level of the digital signal supplied from the memory unit 22. The red, green and blue electron guns of the color cathode ray tube 26 are controlled by the output signals from the color converter 31. The deflection circuit 30 deflects electron beams of the CRT horizontally in synchronism with the horizontal synchronous signal and deflects them vertically in synchronism with the vertical synchronous signal, thereby sweeping the electron beams over the whole screen of the CRT.

Figure 4:
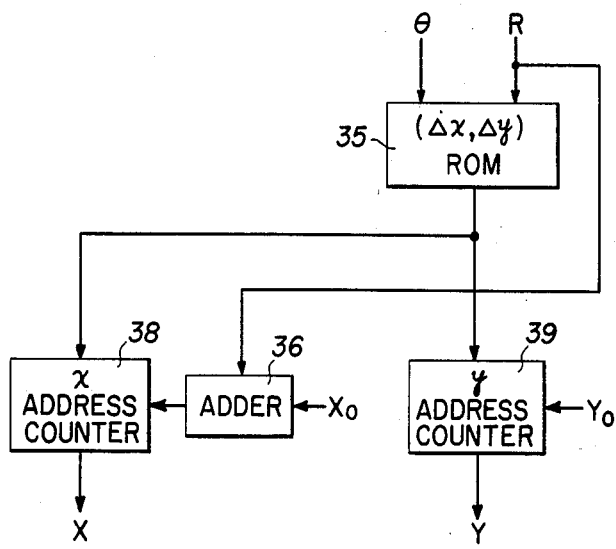
FIG. 4 shows a schematic block diagram of the coordinate converter used in FIG. 1.

Referring to FIG. 4, the output signal from the direction counter 3 is supplied to one input of a memory unit 35 which comprises a read only memory. The output signal from the distance counter 23 is supplied to the other input of the memory unit 35 and to one input of an adder 36. The memory unit 35 stores pairs ($\Delta x$, $\Delta y$) of predetermined binary numerical values at memory elements corresponding to all points in a polar coordinates, and reads out and supplies a pair of numerical values ($\Delta x$, $\Delta y$) according to the signals from the direction counter 3 and distance counter 23, to one input of a x address counter 38 and of a y address counter 39. The x and y address counters 38 and 39 comprise up or down counters. The numerical value $X_0$ of X component of the origin of the CRT is supplied to the other input of the adder 36. The adder 36 adds the value $X_0$ and output signal from the direction counter 23 to one another, and sets the resultant value to the x address counter 38. The x address counter 38 starts counting from the preset value, and increases its count by "1" if $\Delta x$ supplied is "1", and holds its count if $\Delta x$ supplied is "0". The numerical value $Y_0$ of Y component of the origin of the CRT is preset into the y address counter 39. The y address counter 39 starts counting from the preset value, and increases its count by "1" if $\Delta y$ supplied is "1", and does not increase its count if $\Delta y$ supplied is "0". The count outputs from the x and y address counters are supplied to the memory unit 22 through the address switch 25.

Figure 5:
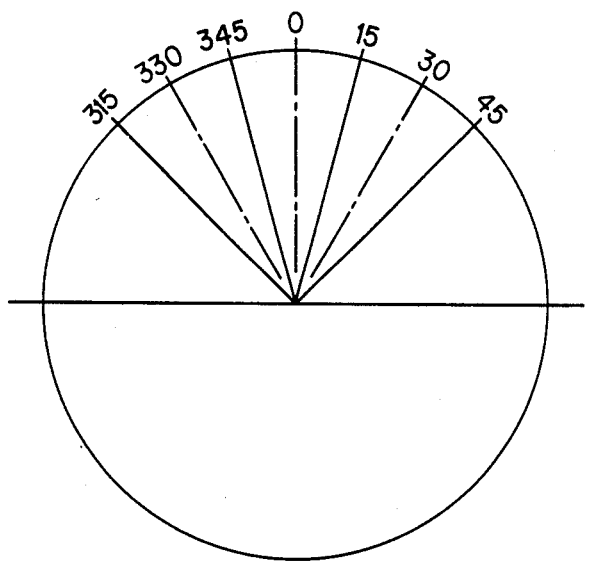
FIG. 5 shows an explanatory diagram for explaining the operation of the underwater detection system shown in FIG. 1.

In operation, assuming that a sector of 90 degrees from a direction of 315 degrees through a direction of 45 degrees is searched as illustrated in FIG. 5, the transmitting and receiving unit 7 is firstly directed to a direction of 330 degrees. A start signal from the controller 5 is supplied to the transmitter 4, the sector counter 2 and direction counter 3. The pulse signals are transmitted from the transmitter 4 to the transmitting and receiving unit 7 through the transmit-receive switch unit 6. The ultrasonic wave pulse is radiated into the water in a sector of as large as 30 degrees. The reception signals received by the transmitting and receiving unit 7 are transmitted to the beamformer 10. A reception beam is repeatedly turned at a high speed from left to right in the sector of 30 degrees, so that echo signals from the pointing directions of the reception beam are caught and supplied to the memory unit 22 through the analog-digital converter 15 and gate 21. The signals supplied to the memory unit 22 are written into the memory elements determined by X- and Y-address signals supplied from the coordinate converter 24. The stored signals are successively read out from the memory elements selected by the count outputs from the X-axis and Y-axis counters 28 and 29, and are supplied to the CRT 26 through the color converter 31. The searched sector of 30 degrees is displayed on the screen of the CRT 26 in a direction of 330 degrees, since the electron beams are repeatedly horizontally and vertically scanned over the screen in synchronism with the reading operation. On completion of the search over the sector from the direction of 315 degrees through the direction of 345 degrees, the transmitting and receiving unit 7 is turned by the turning unit 16 by 30 degrees and then is directed in a direction of 0 degree. A start signal is again transmitted to the transmitter 4, the sector counter 2 and direction counter 3. In the same way as described above, the ultrasonic wave pulse is radiated into the water in response to the pulse signals from the transmitter 4 into the sector of 30 degrees from a direction of 345 degrees through a direction of 15 degrees. The echo signals caught by the turning reception beam are supplied to the memory unit 22 through the analog-digital converter 15 and gate 21 and are written into the memory elements determined by the X- and Y-address signals from the coordinate converter 24. The stored signals are successively read out from the memory elements selected by the count outputs from the X-axis and Y-axis counters 28 and 29, and are supplied to the CRT 26. The searched sector of 60 degrees is displayed on the screen of the CRT 26 from the direction of 315 degrees through the direction of 15 degrees. On completion of the search over the sector from the direction of 345 degrees through the direction of 15 degrees, the controller 5 instructs the turning unit 16 to rotate the transmitting and receiving unit 7 by 30 degrees and directs it in a direction of 30 degrees. A start signal is again transmitted to the transmitter 4, the sector counter 2 and direction counter 3. In the same way, the ultrasonic wave pulse is radiated into the water, and echo signals received are supplied to the memory unit 22. The stored signals read out from the memory elements are supplied to the CRT 26. As a result, the searched sector of 90 degrees is displayed on the screen of the CRT 26 from the direction of 315 degrees through the direction of 45 degrees. When the search over the wide sector of 90 degrees has been completed, the turning unit 16 controlled by the controller 5 turns the transmitting and receiving unit 7 in an anticlockwise direction by 60 degrees and directs the unit 7 in the direction of 330 degrees. In the same way as described above, a start signal is supplied to the transmitter 4 from the controller 5 and, thereafter, the same operation as described above follows. The echo signals supplied to the memory unit 22 replace the signals stored in the memory elements.

It should be noted that although reception beams are successively formed in different azimuthal directions by the beam-former in the foregoing embodiment, a plurality of previously formed reception beams may be successively selected one after another to accomplish the same object.

It should also be noted although a cathode-ray tube is used in the foregoing embodiment, a so-called plasma display or an array of light-emitting diodes can also be used.

It should further be noted that a sector of 30 degrees is searched by the transmitting and receiving unit 7 at a time in the foregoing embodiment, a sector of a smaller or larger angles can be searched by the unit 7 at a time.

It should further be noted that although the transducers are disposed on a straight line in the foregoing embodiment, the transducers may be disposed on an arc of a circle. In this case, the delay circuits are not necessary to be incorporated.

While the invention has been described in detail and with reference to specific embodiments thereof, it will be apparent to one skilled in the art that various changes and modifications can be made therein without departing from the spirit and scope of the invention.

What is claimed is:

1. An underwater detection system comprising:
   a. transmitting and receiving means for transmitting an ultrasonic wave pulse into the water at least in a given search sector of an angle smaller than 36 degrees and for receiving echo signals responsive to said pulse,
   b. said transmitting and receiving means comprising a plurality of transducers,
   c. turning means for turning said transmitting and receiving means and said plurality of transducers by a predetermined angle for enabling search within a sector other than said given sector,
   d. an indicator for displaying the signals in sector form at portions corresponding to said search sector,
   e. a memory unit connected to store signals received by said receiving means,
   f. coordinate converting means for producing output signals corresponding to the direction and range of the echo signals,
   g. writing means for writing output signals from said receiving means former into said memory unit controlled by the output signals from said coordinate converting means, and
   h. reading means for reading out stored signals from said memory unit and supplying them to said indicator.

2. An underwater detection system comprising:
   a. transmitting and receiving means for transmitting an ultrasonic wave pulse into the water at least in a given search sector of an angle smaller than 36 degrees and for receiving signals responsive to said pulse,
   b. said transmitting and receiving means comprising a plurality of transducers,
   c. a single beam former coupled to said receiving means for successively forming directional reception beams in different azimuthal directions within the given sector and producing echo signals responsive to the signals received by the receiving means, each of the directional reception beams being successively formed by said one beam former by utilizing signals received by all of said transducers,
   d. turning means for turning said transmitting and receiving means and said plurality of transducers by a predetermined angle for enabling a search within a sector other than said given sector,
   e. an indicator for displaying signals in sector form at portions corresponding to said search sector,
   f. a memory unit connected to store the signals from said beam former,
   g. coordinate converting means for producing output signals corresponding to the direction and range of the signals received by said receiving means,
   h. writing means for writing output signals from said beam former into said memory unit controlled by the output signals from said coordinate converting means, and
   i. reading means for reading out stored signals from said memory unit and supplying them to said indicator.

3. An underwater detection system as claimed in claim 2 wherein the beam former forms directional reception beams in different azimuthal directions in a sector of 30 degrees.

4. An underwater detection system as claimed in claim 2 wherein the beam former comprises:
   a. phase control means for phase shifting the signals produced by each of said transducers, and
   b. combining means for combining the signals from said phase control means with one another, for successively forming a plurality of directional reception beams.

5. The underwater detection system of claim 4 wherein the angle of the sector is 30 degrees.

6. An underwater detection system comprising:
   a. transmitting and receiving means for transmitting an ultrasonic search signal into the water in a given search sector of substantially 30 degrees and receiving signals responsive to said pulse,
   b. said transmitting and receiving means comprising a plurality of transducers,
   c. a single beam former for successively forming directional reception beams from the signals received by said receiving means in different azimuthal directions within the sector and producing echo signals, each of the directional reception beams being successively formed by said one beam former by utilizing signals received by all of said transducers,
   d. turning means for turning said transmitting and receiving means and said plurality of transducers by a predetermined angle to enable a search within other sectors, for searching said other sectors to enable searching the water in a sector of substantially 90 degrees, e. an indicator for displaying the signals in sector form at portions corresponding to said search sector,
f. a memory unit connected to store the output signals supplied from said beam former,
g. coordinate converting means for producing output signals corresponding to the direction and range of the echo signals,
h. writing means for writing output signals from said beam former into said memory unit controlled by the output signals from said coordinate converting means, and
i. reading means for reading out stored signals from said memory unit and supplying them to said indicator.

* * * * *

UNITED STATES PATENT AND TRADEMARK OFFICE
CERTIFICATE OF CORRECTION

PATENT NO. : 4,672,589
DATED : June 9, 1987
INVENTOR(S) : Takashi Yoshida et al

It is certified that error appears in the above-identified patent and that said Letters Patent are hereby corrected as shown below:

Column 7, line 59, delete "former".

Column 8, lines 11 and 59, each occurrence of "one" should read --single--.

Signed and Sealed this

Twenty-sixth Day of January, 1988

Attest:

DONALD J. QUIGG

Attesting Officer

Commissioner of Patents and Trademarks